United States Patent [19]

Frey et al.

[11] Patent Number: 4,569,489
[45] Date of Patent: Feb. 11, 1986

[54] CABLE TENSION CONTROL DEVICE

[75] Inventors: George R. Frey, Franklin; Ronald K. Dickey, Slippery Rock; Daryl A. Bleakley, Franklin; John E. Willison, New Bethlehem, all of Pa.

[73] Assignee: Joy Manufacturing Company, Pittsburgh, Pa.

[21] Appl. No.: 604,600

[22] Filed: Apr. 27, 1984

[51] Int. Cl.$^4$ ............... B65H 75/42; B65H 59/00; H02G 11/00
[52] U.S. Cl. ............... 242/86.51; 191/12.2 A
[58] Field of Search ............... 191/12.2 A; 254/271, 254/361; 242/86.51, 75.5, 75.51, 75.53

[56] References Cited

U.S. PATENT DOCUMENTS

| Re. 23,300 | 11/1950 | Slomer | 242/86.51 |
|---|---|---|---|
| Re. 24,178 | 7/1956 | Ball | 242/86.51 |
| 2,090,707 | 8/1937 | Sloane | 242/86.51 |
| 2,665,081 | 1/1954 | Slomer | 242/86.51 |
| 3,334,839 | 8/1967 | Carlson | 242/86.51 |
| 3,460,776 | 8/1969 | Stiegler | 242/75.53 |
| 3,934,837 | 1/1976 | Keilhack | 242/75.5 |

Primary Examiner—Stuart S. Levy
Assistant Examiner—Lloyd D. Doigan
Attorney, Agent, or Firm—Raymond W. Augustin

[57] ABSTRACT

A cable tension control device for an electrically powered mine vehicle is disclosed. The vehicle is of the type having an electric trailing cable wound on a cable reel mounted on the vehicle. The cable reel has a motor for rotating the reel in the direction for taking up the cable as the vehicle moves toward a power source and for preventing freespooling of the reel as said cable is unwound as the vehicle moves away from the power source. The device includes a sensor for measuring the amount of electric cable on the reel and utilizes this sensed amount of cable for controlling the drive torque of the motor in direct proportion to the amount of cable sensed on the reel. The same sensed amount of cable is used to control the braking torque developed by the motor when the motor is being driven by the reel as when cable is being pulled off during movement of the vehicle away from the power source.

19 Claims, 6 Drawing Figures

CABLE TENSION CONTROL DEVICE

BACKGROUND OF THE INVENTION

1. Field of the Invention

This invention relates to electrically driven mine shuttle cars and more particularly to the mechanism carried thereby for reeling in and unwinding cables through which electrical current is delivered to the vehicles.

2. Description of the Prior Art

In many applications there are requirements for self-propelled vehicles which utilize a remote power source such as an electric generator to power the vehicle. Normally these vehicles have cable reels mounted thereon for winding in and unwinding the flexible electric cable. Such vehicles as mobile compressors, mine shuttle cars, continuous mining machines, mine locomotives, have cable reel drive and control apparatus for the reel which include a reversible hydraulic motor, a hydraulic pump and a control valve.

With reeling devices of the type mentioned, it is important that they shall be usable not only to wind up the cable when moving toward the point of connection of the latter to the source of power and also to permit the unwinding of such cable when moving away from such connection point, but also when they are moved in courses or paths which will occasion a need for automatically shifting from a winding in to an unwinding, or from an unwinding to a winding in operation that they shall automatically affect such shifting.

It is also important that when the unwinding of cable ceases, there shall be an automatic repositioning of parts so that there may be no possibility of the cables being run over, and also to forestall the accumulation of slack in the cable which might interfere with its smooth winding.

It is therefore important to maintain some tension on the cable even during times when it is being pulled off the reel.

There have been a variety of control devices which control the torque imparted to the cable reel by its drive motor to accomplish the objectives enumerated. Such devices can be seen in U.S. Pat. Nos. 2,589,217; 2,707,598; 2,639,101; 2,670,153; 3,380,545 and 4,108,264.

In general, these prior art devices control the torque produced by the cable reel drive motor at two discrete levels. The first relatively low torque level is utilized when the machine is moving in a direction which tends to unwind the cabel. This torque produces enough force in the cable to take up the slack and keep the cable in the vicinity of the machine, off the ground. A second torque level is utilized as the vehicle moved in the direction tending to wind in the cable. The higher torque is necessary to insure that even with the cable reel drum almost full with cable that there would be sufficient force on the cable to lift it off the ground thereby ensuring that the vehicle does not run over its own cable. In addition, a greater torque is required to wind in the cable since, unlike when the machine is moving away from the power source, the movement of the vehicle does not facilitate the winding in and reel must be driven by the hydraulic system to wind in the cable.

U.S. Pat. No. 4,108,264 takes a different approach to the problem by controlling the output of the drive motor in response to the slack angle of the cable to the vertical.

It has been found that with the high and low torque control devices that the cable is under very high tension when most of the cable is off the reel and particularly when the vehicle travels in a direction in which the cable must be rewound on the reel. Since the force in the cable is equal to the torque divided by the radial distance from the cable reel drum axis, the tension in the cable decreases in proportion to the amount of cable on the reel as the rewinding progresses.

The invention disclosed herein is intended to maintain the tension on the cable at a constant level by varying motor torque in response to the amount of cable on the reel. This allows a minimum torque to be applied to the cable reel by the drive motor when there is relatively little cable on the reel and a much higher torque when the cable reel is almost full. The tension is always maintained within a predetermined limit either in the high or low torque position which limit and the lack of cyclic forces on the cable causes minimum wear on the cable.

SUMMARY OF THE INVENTION

It is an object of this invention to provide a device for controlling the tension in an electric trailing cable of a mine vehicle.

It is a further object of this invention to provide a device for keeping the tension in a electric trailing cable of a mine vehicle within predetermined limits regardless of the movement of the vehicle.

It is yet an additional object of this invention to provide a device to control the tension in an electric trailing cable of a mine vehicle by controlling the drive torque applied to a cable reel mounted on the vehicle.

It is still another object of the invention to provide a device for controlling the tension in a cable by directly varying the output of a pressure control valve to a hydraulic motor powering the cable reel.

It is still a further object of this invention to provide a cable reel in which a variable braking force is applied to the cable reel as the reel is unwound.

It is yet an additional object of this invention to provide a device for controlling the tension in an electric trailing cable by varying either the voltage or the current input to an electric motor driving the cable reel.

It is yet a further object of this invention to provide a device for controlling the tension in a cable which varies the torque to the cable reel in direct proportion to the amount of cable on the reel.

These and other objects of the present invention are incorporated in a cable tension control device for an electrically powered mine vehicle of the type having electric trailing cable wound on a cable reel mounted on the vehicle. The cable reel has a motor, preferably a hydraulic motor, for rotating the reel in opposite directions for taking up and unwinding the cable. The device includes a lever arm mounted to rotate about an axis parallel to the axis of rotation of the cable reel for measuring the amount of cable on the cable reel drum. The end of the lever opposite the end in contact on the cable reel controls the output pressure of a valve which varies the amount of pressure to the hydraulic motor driving the cable reel. As the lever arm moves away from the surface of the cable reel drum, i.e. as the cable is wound on the drum, hydraulic fluid either at a higher pressure is allowed to drive the hydraulic motor thereby producing a higher cable winding torque output from the motor or a higher braking torque to prevent freewheeling of the cable reel when unwinding cable. The pressure to the hydraulic motor varies directly with the amount of cable on the drum with the maximum allowable pressure when the cable reel is full. The lever arm and the pressure control valves are designed to keep the tension in the cable within the predetermined limit.

These and other advantages of the present invention will become more apparent upon reference to the following detailed specification and drawings.

DESCRIPTION OF THE PREFERRED EMBODIMENT

Figure 1:
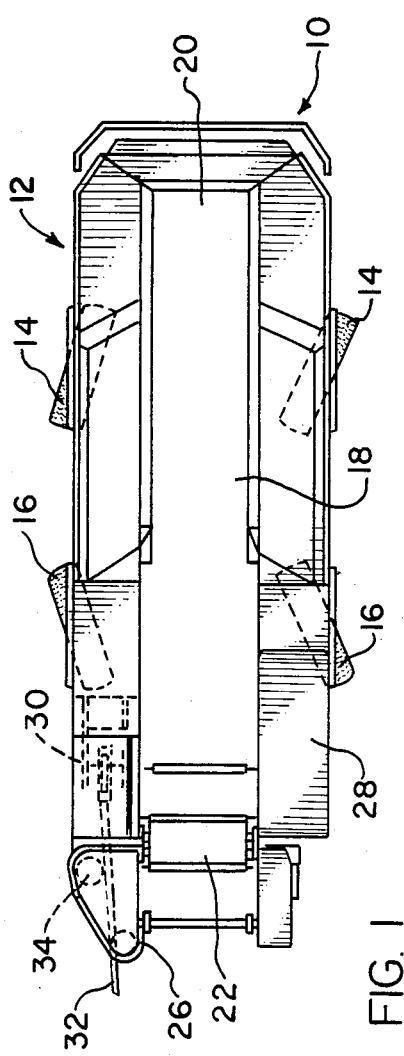
FIG. 1 is a plan view of a mine vehicle in which the present invention is mounted.

As can be seen in FIG. 1 the mine haulage vehicle or shuttle car 10 which incorporates therein a cable reel assembly including control device of the present invention comprises a body 12 mounted on pairs of front and rear traction and steering wheels 16 and 14, respectively, and additionally includes a material receiving compartment 18 extension longitudinally through the body 12 between wheels 14 and 16. Compartment 18 includes a material receiving end portion 20 and a material discharge end portion 22. Extending along the bottom of the compartment 18 is a conventional endless flight conveyor (not shown). Discharge end portion 22 includes a tiltable end frame 26 which is tiltable to effect variation in the discharge height of the conveyor. Arranged on one side of the discharge end portion 22 is an operator control station 28. Arranged on the opposite side of the discharge end portion 22 is a cable reel assembly 30 which includes the control device of the present invention. A power conductor or cable 32 is wound on the cable reel assembly 30. The tiltable end frame 26 carries suitable guides 34 for the cable 32, whereby the latter can be extended in various directions from the vehicle in connection with a suitable power source. Inasmuch as the invention herein resides in the cable reel assembly 30 and in the control device means assembly 40 and the balance of the elements specified herein above are well known in the art, a further description of such known elements will not be set forth except where necessary in the description of the invention herein. For purposes of the hereinafter set forth description, forward and rearward shall refer respectively to ends 22 and 20 in the mine vehicle 10.

Cable reel assembly 30 comprises an elongated generally cylindrical cable reel 38 which is supported by a stationary bracket 56. The cable reel 38 includes an elongated generally cylindrical drum member 42 which is coaxial and extends along the axis X—X of reel 38 which has left and right flanges 44 and 43 which are secured to drum 42 at the respective axial ends thereof. A cable receiving opening 50 extends transversly through the drum assembly intermediate the axial ends thereof for receiving end portion 52 of cable 32 within the interior of the drum. The cable end 52 maybe connected in any well known manner to the electrical system of the mine shuttle car.

As indicated the preferred cable reel 38 is rotatably supported adjacent one axial end by bracket 56. With the cable reel assembly 30 so disposed, the cable reel 38 is rotatably driven during winding in cable by means of a suitable hydraulic motor 60 which is fixably secured to the vehicle body and which receives hydraulic pressure fluid from any suitable source such as a pump (not shown). A sprocket 62 is secured to the cable reel 38 adjacent bracket 56 and extends radially outward therefrom. During the winding operation Motor 60 rotatably drives reel 38 by means of a chain 66 which communicates between drive sprocket 63 on the outward drive shaft therefor and sprocket 62.

Figure 3:
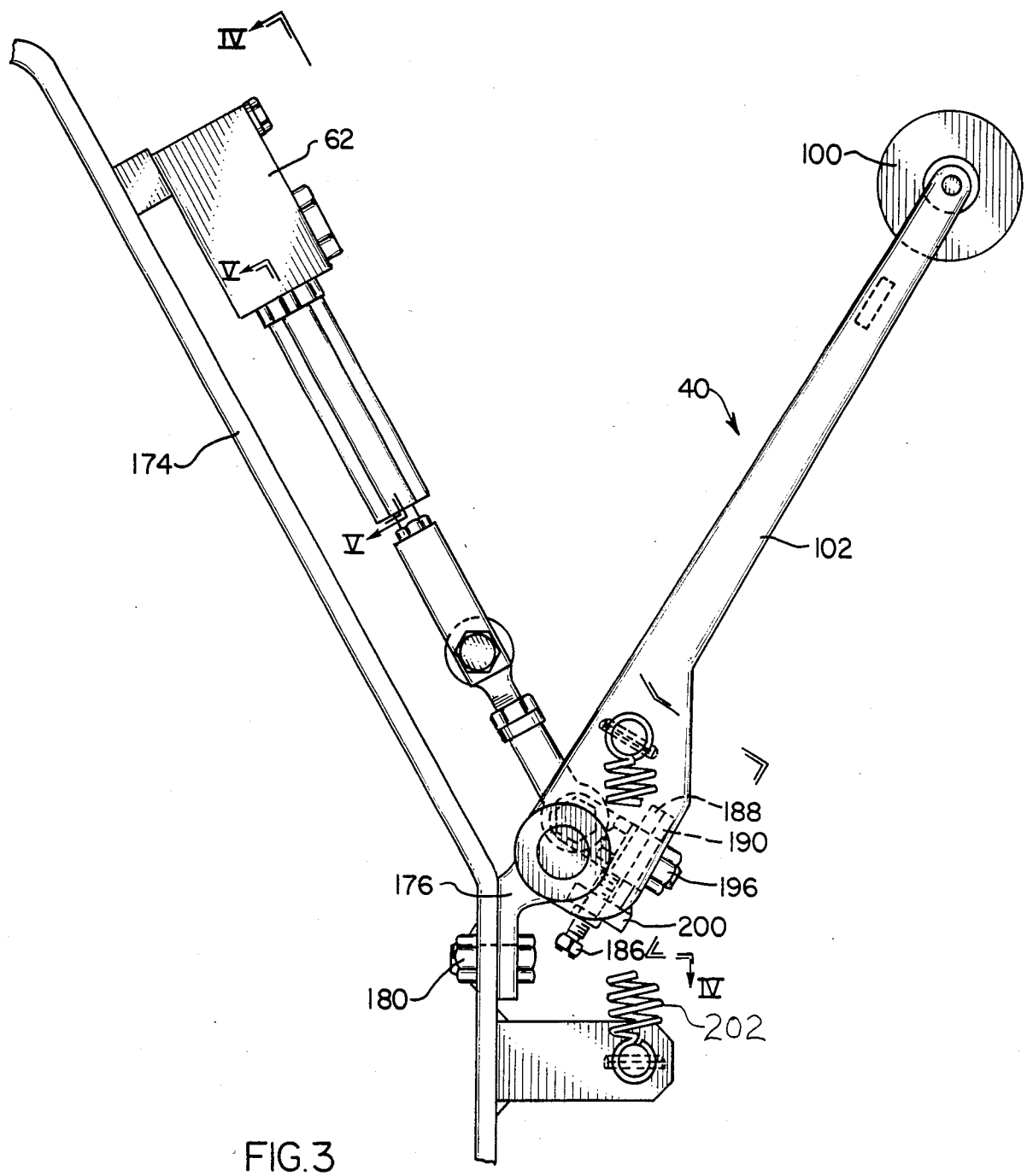
FIG. 3 is an enlarged elevation view of the device shown in FIG. 2.
Figure 4:
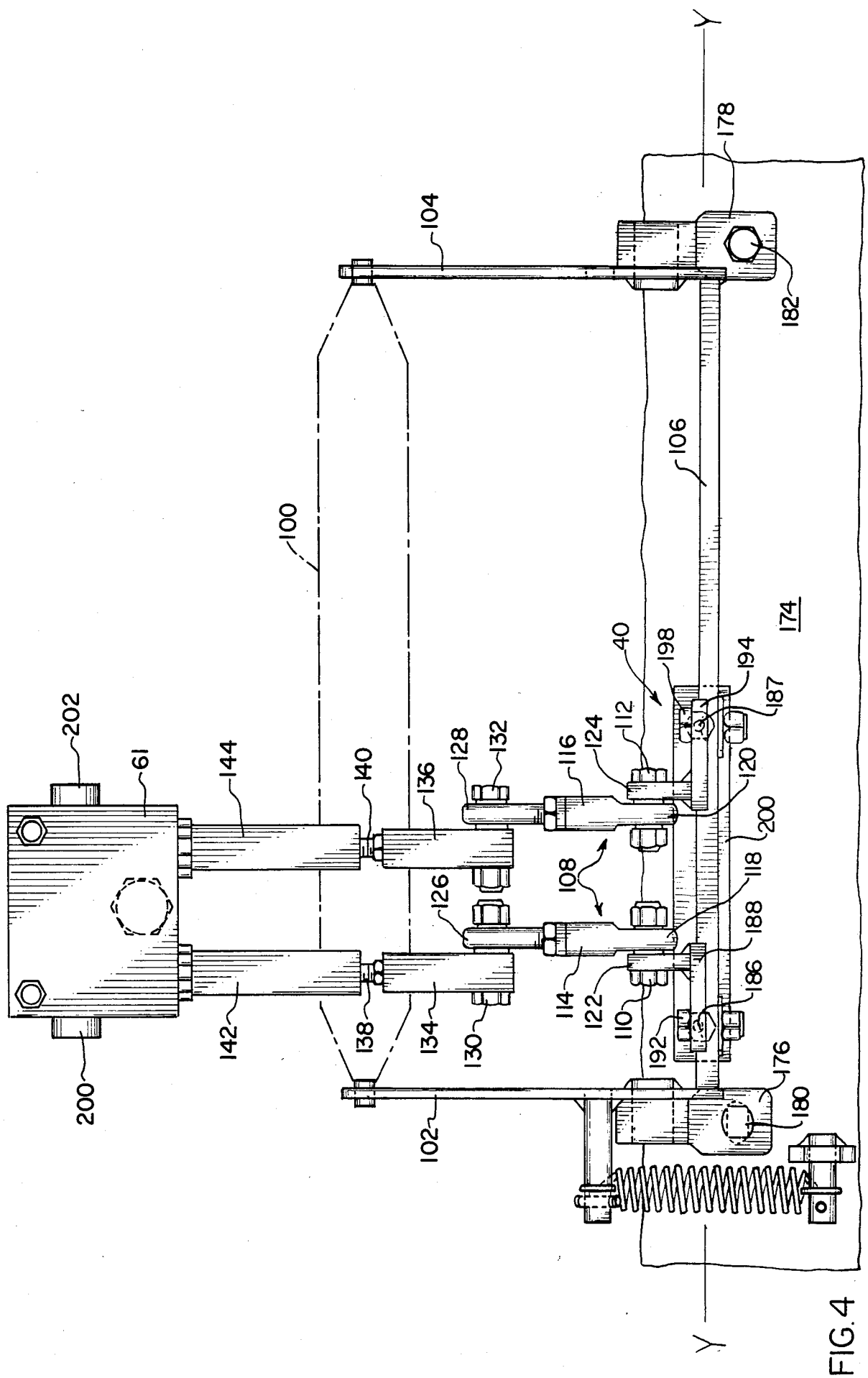
FIG. 4 is a sectional view of the device which is shown in FIG. 3 along the lines II—II.

During unwinding of the cable 32 from the cable reel assembly 30 as when the mine vehicle 10 moves away from the power source (not shown) the cable reel would tend to freewheel about its rotating axis were it not for the pressure within the hydraulic system. As the cable reel turns, because of the motion of the vehicle and resultant force of the cable being pulled off the reel, it drives the hydraulic motor 60 which is now acting as a pump to force hydraulic fluid through the cable reel control valve 61 as shown in FIGS. 3 and 4 and as described in greater detail herein below, to create a braking effect on the cable reel thereby preventing the reel from free spooling and dumping too much cable onto the ground when the vehicle slows or stops. As can be seen the sprocket 62, during unwinding, would be the drive sprocket and would drive sprocket 63 by means of chain 66.

Figure 2:
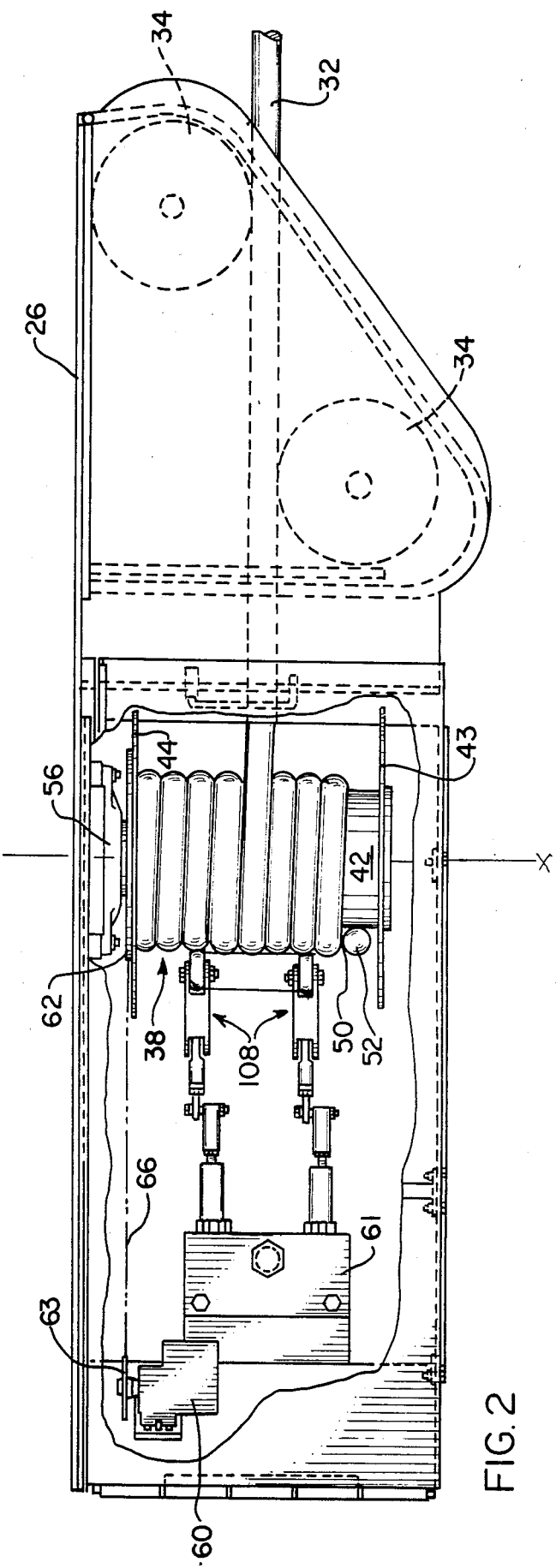
FIG. 2 is a plan view of the area of the mine vehicle shown in FIG. 1 which includes the cable reel and the sensing device of the present invention.

As can be best seen in FIGS. 2, 3, and 4 there is disclosed a device, generally denoted as 40, for sensing the amount of cable on the reel and varying the pressure to the hydraulic motor input during winding in or varying the back pressure in the motor 60 during unwinding. The changing pressure changes the drive torque or reel braking torque imparted through chain 66 to sprocket 62 or 63 of the cable reel assembly 30.

In the preferred embodiment the sensing device 40 consists of a roller 100 rotatably supported by brackets or lever arms 102 and 104. The brackets 102 and 104 are supported by bar or shaft 106 for rotation about axis Y—Y. Axis Y—Y is parallel to the axis X—X through the cable reel drum 42.

In the preferred embodiment two linkages generally denoted as 108 are connected to bar or shaft 106 by the pin connections 110 and 112 respectively. In the linkage arrangement 108, links 114 and 116 are rotatably connected to pins 110 and 112 respectively. The pins 110 and 112 join the ends 118 and 120 of links 114 and 116 to flange portions 122 and 124 which are connected to bar or shaft 106 for rotation therewith about axis Y—Y. Ends 126 and 128 of links 114 and 116 respectively are connected through a pin connection 130 and 132 to second links 134 and 136 of the link arrangement 108.

In the preferred embodiment the lengths of links 114, 116, 134 and 136 can be adjusted. In the preferred embodiment this is accomplished by threadedly coupling the ends such as 120 and 128 so that they may be adjusted towards or away from one another by the threaded interconnection therebetween. The links 134 and 136 have threaded rods 138 and 140 threaded into the ends thereof opposite the pin connection points 130 and 132.

Figure 6:
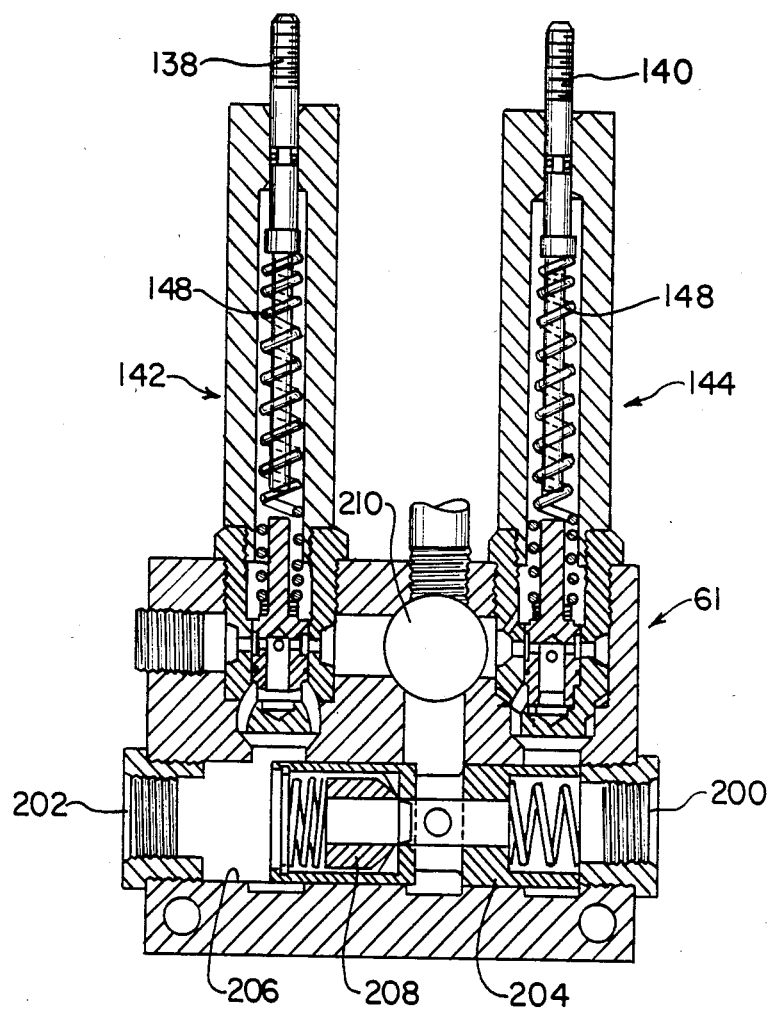
FIG. 6 is a sectional view of the pressure control valve shown in FIG. 3.

The rods 138 and 140 enter relief valves 142 and 144 respectively. Relief valve 142 is connected to the low torque side of control valve 61 and relief valve 144 is connected to the high torque side of control valve 61. As can be best seen in FIG. 6, the control valve 61 has an inlet 200 and an outlet 202. There is a movable control spool 204 located within a bore 206 between outlet 202 and inlet 200.

Internally of spool 204 there is a check valve 208. When the car is operating in a high torque mode, that is when the motor 60 is driving the cable reel 42, the spool 204 is positioned such that hydraulic fluid flows in the inlet 200 of valve 61 unseating check valve 208 and out the outlet 202 to the hydraulic motor 60. When the cable reel valve 61 is in a low torque position as when cable is being unwound off the cable reel and the mine vehicle is moving away from the source of power, the spool 204 of the cable reel control valve 61 is moved by the hydraulic pressure developed by the hydraulic motor 60 now acting as a pump and moves such that the flow is from the inlet 200 to port 210 and then into a tank or reservoir where the hydraulic driving pump (not shown) recirculates it through the inlet 200.

As can be seen, the flow from the hydraulic motor 60 is preventing from going directly to outlet 210 by check valve 208. Instead the flow of fluid from the reservoir through motor 60 back to the reservoir through port 210 is controlled by the low torque relief valve 142. Upon sufficient pressure to unseat the low torque relief valve 142, hydraulic fluid will flow will flow through outlet 202 from the hydraulic motor 60 through the relief valve 142 and to the reservoir through outlet 210. Similarly, during the driving portion of the cycle, fluid flows in through inlet 200 and to the outlet 202 as long as the pressure does not unseat relief valve 144 which again would permit flow from the inlet 200 directly to the reservoir thereby limiting the pressure to hydraulic motor 60 and therefore the output torque of that motor to the cable reel. The reel valve 61 basically allows flow in one direction from a hydraulic pump past the high torque relief valve 144 when the cable is being wound on the drum then to the hydraulic motor 60 to drive the cable reel. The control valve then allows fluid to flow in the opposite direction from the hydraulic motor 60, through the low torque relief valve 142 and then to a reservoir (not shown) when the cable is being unwound from the cable reel and the cable reel is actually driving the hydraulic motor 60 making the motor 60 a pump. It can be seen that the low torque relief valve 142 acts to brake the cable reel and prevent it from free spooling. The amount of braking torque developed by the low torque relief valve depends upon the relief pressure setting, which can be varied as will be described below.

Figure 5:
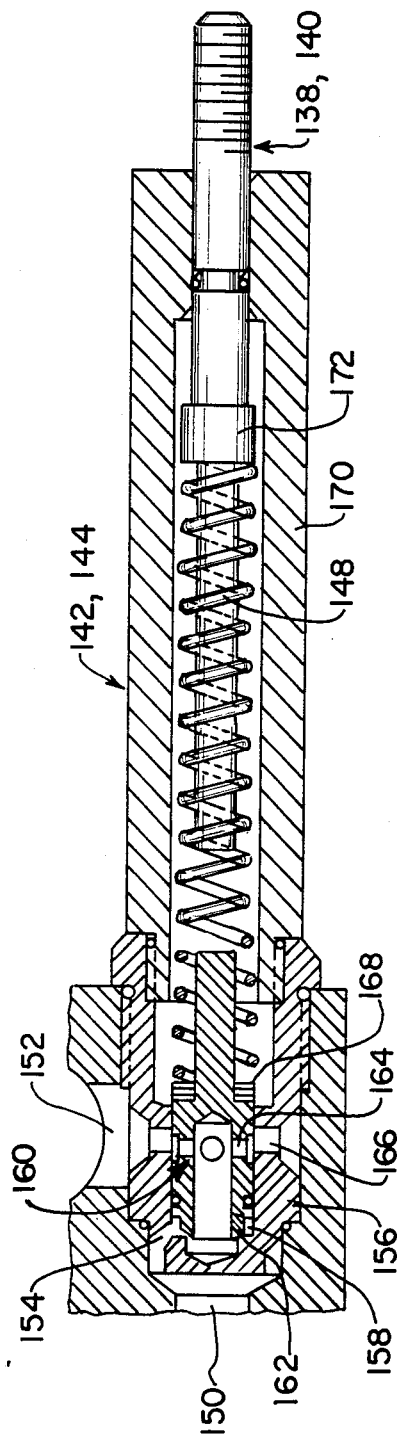
FIG. 5 is a cross section of the pressure relief valve shown in FIG. 3 along lines III—III.

In the preferred embodiment the rods 138 and 140 will be moved by the linkage arrangement upon movement of the roller 100 in response to the amount of cable on the cable reel drum 42. As can be seen in FIG. 5 the rods 138, 140 are coaxial with the axis of relief valves 142 and 144. Rods 138 and 140 move axially into the valves as the lever arm moves away from the surface of drum 42 and axially out of relief valves 142, 144 as the roller moves toward the surface of drum 42 as when cable is wound off the drum.

FIG. 5 shows an internal cutaway of the cable relief valves 142 and 144 which in the preferred embodiment are of identical construction with the exception of the amount of built in tension on spring 148. As can be seen in FIG. 5 the preferred relief valve has an inlet 150 from pressure control valve 62 and an outlet 152 which flows into a hydraulic reservoir tank (not shown). Fluid from either the hydraulic pump in the case of the high torque relief valve or from the hydraulic motor 60 as it is driven by the cable reel during unwinding enters the inlet 150 from the control valve 61 and through a hole 154 in the valve cartridge 156 the high pressure fluid impinges on rim 158 of poppet 60. The pressure from the fluid flowing through inlet 150 is balanced by the tension in spring 148. As the pressure at the inlet 150 rises to a point where poppet 160 unseats itself from the seat 162 of cartridge 156 fluid flows into the center of poppet 160 and out holes 164 in the poppet 160 through holes 166 and cartridge 156 and out the outlet 152 into the hydraulic fluid reservoir. This arrangement effectively limits the amount of pressure at inlet 150.

As indicated above, the relief settings of the low torque relief valve 142 and the high torque relief valve 144 are significantly different. In the preferred embodiment the release setting for the low torque relief valve is between 150 and 300 psi and the setting for the high torque relief valve is between 350 and 850 psi. The different relief settings are accomplished with the use of identical springs 148 by including in the high torque relief valve a series of shims 168 and also by varying the initial distance which rod 140 is located within the housing 170 of relief valve 144. As can be seen in FIG. 5, rods 138 and 140 extend only a predetermined distance within the housing 170 of the relief valve. This permits movement along the axis of housing 170 by rods 138 or 140 to compress spring 148. Likewise rods 138 and 140 can be moved out of the relief valve housing 170 a predetermined distance limited by stop 172. This movement either compressing the spring 148 or relieving the compression of spring 148 changes the relief valve setting by changing the pressure at which poppet 160 will unseat from seat 162.

As can be best seen in FIG. 3, the preferred linkage arrangement provides the axial movement of rods 138 and 140 as discussed above. The valve 61 is mounted on the body 174 of the vahicle 10. The bar or shaft 106 which supports arms 102 and 104 is rotatably mounted on brackets attached to the body 174. In the preferred embodiment bar or shaft 106 is mounted by brackets 176 and 178 which are bolted to body 174 by bolts 180 and 182. The brackets 122 and 124 are mounted on bar or shaft 106 for movement therewith as bar or shaft 106 rotates in response to the movement of roller 100. In addition, brackets 122 and 124 are adjustable with respect to axis Y—Y either towards or away from roller 100. This movement is accomplished by adjustment screw 186 and slots in brackets 188 and 194. Brackets 188 and 194 and bar or shaft 106 are held together in sliding contacts by bolts 192 and 198 respectively. Adjustment screws 186 and 187 are mounted in plate 200 and can be adjusted to move the location of pins 110 and 112 in a direction parallel to the arms 102 and 104 to vary the length of insertion of rods 138 and 140 into relief valves 142 and 144 respectively. Roller 100 is biased towards the cable reel by spring 202. As indicated above, the pressure settings of relief valves 142 and 144 can be varied by either adding or deleting shims 168. In addition, as described in general above, the initial tension of spring 148 on either valve can be adjusted by moving the location of pin connection 110 and 112 by adjusting screws 186 and/or 187. For instance, if the location of pin connection 110 were moved upward toward roller 100, the initial insertion of rod 138 into relief valve 142 would be greater. With this method, one skilled in the art could adjust the relief settings at adjustment screws 186 and 187 without having to make any changes in the internals of valves 142 and 144.

As can be seen in FIGS. 3 and 4, movement of the roller 100 away from the surface of drum 142 would move the linkage system in a manner which would push rods 138 and 140 into valves 142 and 144 thereby compressing springs 148 and raising the relief pressure of either valve. This would produce either a higher braking torque if the control valve 61 is in the low torque mode or a higher drive torque if the control valve is in the high torque mode thereby producing a more constant tension in the cable 32. Conversely as cable is wound off the drum, roller 100 would move towards the surface of cable reel drum 42 thereby moving rods 138 and 140 out of relief valves 142 and 144 thereby lowering the relief pressure and consequently reducing either the braking torque or the drive torque affecting the cable reel. This would tend to keep tension in the cable constant because the torque is reduced as the radius of cable on the drum is reduced. Since the force in the cable is equal to the torque on the cable reel divided by the radius at which the cable is being pulled off then as the radius either increases or decreases the torque must be varied directly to maintain the tension constant.

It has been found that in the low torque mode of a cable reel valve that varying the braking pressure within a present range of 150 to 300 psi produces a torque variation which keeps the cable tension approximately constant and that varying the high torque pressure within a present range of 350 to 850 produces a drive torque which is relatively constant around approximately 80 psi as the cable is wound onto the cable reel drum.

It can be seen that if the cable reel drive motor were electric the device of the present invention could still be used if the relief valves 142 and 144 were replaced by electric circuits capable of varying the current to the cable reel drive motor. The current to the drive motor would be varied in direct response to the amount of cable on the cable reel to thereby vary the drive torque to the motor. A regenerative braking circuit for a DC drive motor can be used to varying braking torque. Such a regernerative braking circuit is discussed in U.S. Pat. No. 4,042,864.

While the invention has been described in conjunction with specific embodiments thereof it is evident that there are many alternatives, modifications, and variations apparent to those skilled in the art in view of the foregoing descriptions. Accordingly, this application is intended to embrace all such alternatives, modifications and variations as fall within the spirit and scope of the appended claims.

We claim:

1. A cable tension control device for an electrically powered mine vehicle of the type having an electric trailing cable would on a cable reel mounted on said mine vehicle, said cable reel having a motor for rotating said reel in the direction for taking up said cable as said vehicle moves towards a power source and for preventing freespooling of the reel as said cable is unwound as said vehicle moves away from said source, said device comprising:

means for sensing the amount of said electric cable on said cable reel;

first means utilizing said sensed amount of cable for constantly varying the drive torque developed by said motor in direct proportion to said sensed amount of cable to maintain the tension in said cable substantially constant about a first predetermined limit throughout said taking up of said cable; and ssecond means utilizing said sensed amount of cable for constantly varying the braking torque developed by said motor, when said motor is driven by said reel, in direct proportion to said sensed amount of cable to maintain said tension in said cable about a second predetermined limit during said unwinding.

2. A cable tension control device as set forth in claim 1 wherein said means for sensing the amount of electric cable on said cable reels measures the distance of the surface of the cable on said reel from the surface of said cable reel.

3. A cable tension control device as set forth in claim 2 wherein said means for sensing the amount of cable on said reel includes at least one lever arm contacting said cable reel at one end thereof and having another end thereof pivoted about an axis running generally parallel to the axis of rotation of said cable reel whereby said lever arm rotates about its axis in response to the winding or unwinding of said cable around said cable reel.

4. The cable tension control device set forth in claim 3 wherein said lever arm is spring biased and in contact with said cable on said cable reel.

5. The cable tension control device set forth in claim 3 wherein said lever arm has a roller at a first end thereof for rolling contact with said cable as said cable reel rotates.

6. The cable tension control device as set forth in claim 1 wherein said motor is a hydraulic motor.

7. The cable tension control device as set forth in claim 6 wherein said means for controlling the drive torque output of said motor during said winding is a pressure control valve, the output pressure of which can be varied in direct response to the distance of said lever arm from said cable reel surface.

8. The cable tension control device as set forth in claim 6 wherein said braking torque developed by said motor during said unwinding is controlled by a variable pressure relief valve the relief pressure of which can be varied in direct response to the distance of said lever arm from said cable reel.

9. A cable tension control device as set forth in claim 1 wherein said motor is a variable speed electric motor.

10. A cable tension control device as set forth in claim 9 wherein said means for controlling the torque of said motor varies the current to said motor in direct response to the distance of said lever arm away from said axis of rotation of said cable reel.

11. A cable reel mounted on an electrically powered mine vehicle of the type having electric trailing cable wound on said cable reel, said cable reel having a motor for rotating the reel in the direction for taking up the cable as the vehicle moves toward the power source and for providing breaking for said cable reel as said cable in unwound as said vehicle moves away from said source, said improvement comprising means mounted on said mine vehicle for sensing the amount of electric cable on said cable reel;

means utilizing said sensed amount of cable for constantly varying the drive torque developed by said motor throughout said taking up of said cable and for controlling the amount of braking applied to said cable reel suring winding of said cable, said means controlling either said drive torque or said breaking in direct proportion to said sensed amount of cable to maintain said tension in said cable substantially constant about a first predetermined limit during taking up of said cable and a second predetermined limit during unwinding of said cable.

12. The cable tension control device as set forth in claim 11 wherein said motor is a hydraulic motor.

13. The cable tension control device as set forth in claim 11 wherein said means for controlling the drive torque or braking torque developed by said motor includes a pressure control valve the output pressure of which can be varied in direct proportion to the amount of cable sensed on said cable reel.

14. The cable tension control device as set forth in claim 11 wherein said motor is a variable speed electric motor.

15. A cable tension control device as set forth in claim 13 wherein said means for controlling the torque output of said motor varies the current to said motor in direct proportion to said sensed amount of cable on said cable reel.

16. A method of controlling the tension in an electric trailing cable of an electrically powered mine vehicle of the type having an electric trailing cable wound on a cable reel mounted on said vehicle, said cable reel having a motor for driving said reel in one direction for taking up said cable and for braking said reel when unwinding said cable, said method comprising:
  sensing the amount of electric cable on said cable reel;
  varying the drive torque of said motor in direct proportion to said sensed amount of cable to maintain the tension in said cable substantially constant about a first predetermined limit throughout the taking up of said cable; and
  varying the braking torque developed by said motor in direct response to the send amount of cable on said cable reel to maintain the tension in said cable substantially constant about a second predetermined limit during unwinding said cable.

17. A method for controlling the tension in an electric trailing cable as set forth in claim 16 wherein said sensing the amount of cable on said cable reel is accomplished by sensing the distance of the surface of the uppermost cable layer on said reel from the surface of said cable reel.

18. A method for controlling the tension in an electric trailing cable as set forth in claim 17 wherein said motor is a hydraulic motor.

19. A method for controlling the tension in an electric trailing cable as set forth in claim 18 wherein said controlling of the drive torque of said motor is accomplished by controlling the hydraulic pressure input to said motor in direct response to said sensed amount of cable on said cable reel.

* * * * *